United States Patent
Roy et al.

(10) Patent No.: US 7,802,241 B2
(45) Date of Patent: Sep. 21, 2010

(54) METHOD FOR ESTIMATING PROCESSOR ENERGY USAGE

(75) Inventors: Sourav Roy, West Bengal (IN); Ashish Mathur, New Delhi (IN)

(73) Assignee: Freescale Semiconductor, Inc., Austin, TX (US)

( * ) Notice: Subject to any disclaimer, the term of this patent is extended or adjusted under 35 U.S.C. 154(b) by 953 days.

(21) Appl. No.: 11/609,102

(22) Filed: Dec. 11, 2006

(65) Prior Publication Data

US 2007/0136720 A1   Jun. 14, 2007

(30) Foreign Application Priority Data

Dec. 12, 2005   (IN) .................. 3342/DEL/2005

(51) Int. Cl.
*G06F 9/45*   (2006.01)
*G06F 9/46*   (2006.01)

(52) U.S. Cl. .................. 717/151; 717/127; 718/104; 713/300; 713/340

(58) Field of Classification Search ................. 717/151, 717/127
See application file for complete search history.

(56) References Cited

U.S. PATENT DOCUMENTS

| | | | | |
|---|---|---|---|---|
| 6,002,878 | A * | 12/1999 | Gehman et al. | 713/340 |
| 6,173,389 | B1 * | 1/2001 | Pechanek et al. | 712/24 |
| 6,230,204 | B1 * | 5/2001 | Fleming, III | 709/229 |
| 7,529,948 | B2 * | 5/2009 | Conroy et al. | 713/300 |
| 7,703,079 | B1 * | 4/2010 | Burrows et al. | 717/127 |
| 2003/0167460 | A1 * | 9/2003 | Desai et al. | 717/151 |
| 2005/0114850 | A1 * | 5/2005 | Chheda et al. | 717/151 |

OTHER PUBLICATIONS

Sami, Mariagiovanna et al.; "An Instruction-Level Energy Model for Embedded VLIW Architectures"; IEEE Transactions on Computer-Aided Design of Integrated Circuits and Systems; Sep. 2002; pp. 998-1010; vol. 21, No. 9; IEEE.
Sami, M. et al.; "Instruction-Level Power Estimation for Embedded VLIW Cores"; Codes 2000, San Diego, CA, USA. pp. 34-38; ACM 2000.
Lee, Mike Tien-Chien et al; "Power Analysis and Minimization Techniques for Embedded DSP Software"; IEEE Transactions on Very Large Scale Integration (VLSI) Systems; Mar. 1997; pp. 123-135; vol. 5, No. 1; IEEE.
Tiwari, Vivek et al.; "Power Analysis of Embedded Software: A First Step Towards Software Power Minimization"; IEEE Transactions on Very Large Scale (VLSI) Systems; Dec. 1994; pp. 437-445; vol. 2, No. 4; IEEE.

* cited by examiner

*Primary Examiner*—Thomas K Pham
(74) *Attorney, Agent, or Firm*—Charles Bergere

(57) ABSTRACT

A method for estimating energy usage of a program code executed by a very long instruction word (VLIW) processor. The program code includes multiple instructions, which are organized as groups referred to as execution sets. The instructions of an execution set are executed simultaneously. A no operation (NOP) energy and incremental instruction energy for each execution set of the program code are determined to compute a base energy of each execution set. An inter-execution set energy of each execution set is then computed. The estimated energy usage of each execution set is determined by adding the corresponding inter-execution set energies to the base energies. A stall energy consumed on account of executing the program code is then computed. Finally, the estimated energy usage of the program code is determined by adding the stall energy to the determined energies of all the execution sets.

20 Claims, 4 Drawing Sheets

METHOD FOR ESTIMATING PROCESSOR ENERGY USAGE

BACKGROUND OF THE INVENTION

The present invention relates generally to the field of energy usage in processors and in particular, to energy usage estimation of program code executable by very long instruction word (VLIW) processors.

Digital signal processors (DSPs), such as very long instruction word (VLIW) processors, are widely used in hand-held electronic devices such as mobile phones, personal digital assistants (PDAs), and digital cameras. Low power is an important criterion for the hand-held devices, which have limited power reserves. The energy consumed by software executed by a processor can be used to determine the total power and energy requirements of the processor, and therefore, to predict the battery life of a hand-held device using the processor. Software energy estimation can also be used as a starting point for software optimization techniques for reducing power consumption of the processor.

There are several known approaches for estimating software energy consumption. These include gate-level, micro-architectural level, and instruction level approaches. The instruction level approach is very useful from application software power profiling perspective. In this approach, a base energy consumption is associated with each instruction of the software. In addition, an inter-instruction energy consumption is associated with each instruction to account for the energy cost associated with change from previous instructions to present instruction. However, some of the methods that use the instruction level approach associate a constant energy cost for the inter-instruction effect.

Other methods of modeling inter-instruction energy cost involve clustering of similar instructions into different groups. A look up table that includes energy values for change in the instructions from one group to another group is then used to estimate the energy of the software. However, these approaches work well for simple processors such as single issue processors. Further, considerable memory space is required to store the look-up tables.

It is an object of the present invention to provide a method of accurately estimating processor energy usage especially for VLIW processors. It is also an object of the present invention to provide such a method without requiring considerable memory space.

BRIEF DESCRIPTION OF THE DRAWINGS

The following detailed description of preferred embodiments of the present invention will be better understood when read in conjunction with the appended drawings. The present invention is illustrated by way of example and not limited by the accompanying figures, in which like references indicate similar elements.

DETAILED DESCRIPTION OF THE PRESENT INVENTION

Figure 1:
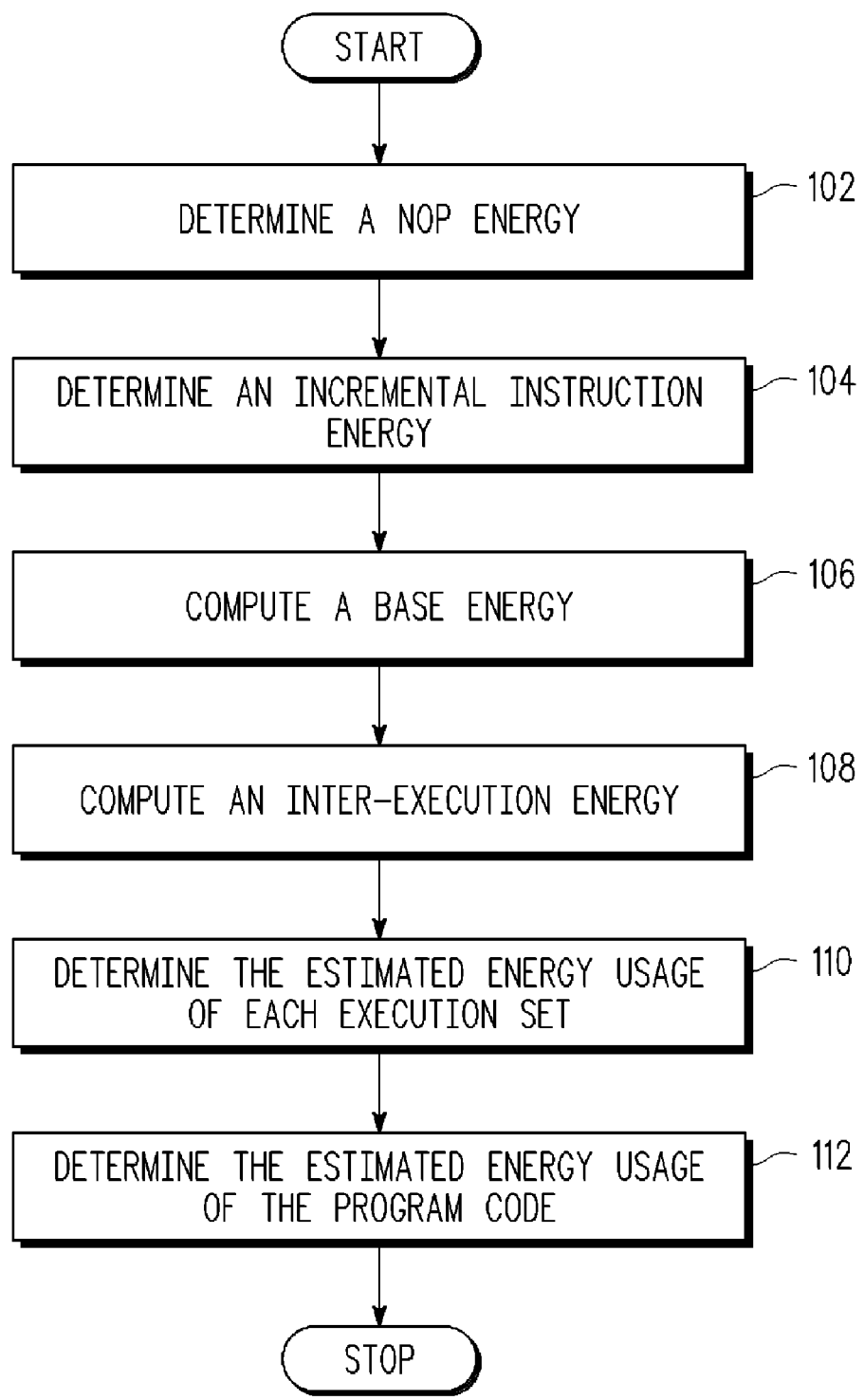
FIG. 1 is a flowchart of a method for estimating energy usage of program code executed by a VLIW processor in accordance with an embodiment of the present invention.

The detailed description in connection with the appended drawings is intended as a description of the presently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

The present invention provides a method for estimating energy usage of program code executed by processor, especially a VLIW processor. The program code includes a plurality of instructions. The instructions are organized as groups, referred to as execution sets. The instructions of an execution set execute substantially simultaneously. The energy usage estimation method includes determining a no operation (NOP) energy for each execution set, determining an incremental instruction energy of each instruction of each execution set, computing a base energy of each execution set, computing an inter-execution set energy of each execution set, determining the estimated energy usage of each execution set, and then determining the estimated energy usage of the program code. The NOP energy is determined based on a position and length of the execution set, and the number of cycles for executing the execution set. The incremental instruction energy of each instruction of each execution set is determined based on predicated execution thereof. The base energy of each execution set is computed by adding the NOP energy and the incremental instruction energy of the respective execution sets. The inter-execution set energy is computed based on a number of instruction changes in the execution set. The estimated energy usage of the execution set is determined by adding the base energy and the inter-execution-set energy thereof. Finally, the estimated energy usage of the program code is determined by adding the determined energies of all the execution sets.

In another embodiment of the present invention, the present invention provides a system for estimating energy usage of program code executed by a processor, especially a VLIW processor. The program code includes a plurality of instructions. The instructions are organized as groups, referred to as execution sets. The instructions of an execution set execute substantially simultaneously. The energy usage estimation system includes a base energy calculator, an inter-execution set energy calculator, an execution set energy calculator, a stall energy calculator, and an energy calculator. The execution set energy calculator is coupled to the base energy calculator, and the inter-execution set energy calculator. The energy calculator is coupled to the execution set energy calculator and the stall energy calculator. The base energy calculator computes a base energy of each execution set of the program code by adding a no operation (NOP) energy and an incremental instruction energy of the respective execution sets. The inter-execution set energy calculator computes an inter-execution set energy of each execution set based on a number of instruction changes in the execution set. The execution set energy calculator determines the estimated energy usage of each execution set by adding the base energy and the inter-execution set energy thereof. The stall energy calculator computes a stall energy for the program code. The energy calculator determines the estimated energy usage of the program code by adding the determined energies of all of the execution sets and the stall energy.

The present invention estimates energy usage of program code. The program code is executable by a VLIW processor such as a VLIW-DSP core. In an embodiment of the present invention, the estimated energy usage of the program code is computed by software that interacts with an instruction set simulator (ISS) of the VLIW-DSP core. The software estimates the energy and power consumed by the program code, at an instruction level. Once the energy and power consumption of the program code are estimated, the program code can be modified to reduce the energy and power consumption. The estimated energy usage can also be used to predict the battery life of electronic devices that include VLIW-DSPs that execute the program code. Examples of such electronic devices include mobile phones, PDAs, and digital cameras.

Referring now to FIG. 1, a flowchart of a method for estimating the energy usage of the program code executed by the VLIW processor, in accordance with an embodiment of the present invention, is shown. The program code includes a plurality of instructions. The instructions are organized as groups of execution sets. The instructions of an execution set execute simultaneously. At step 102, a no operation (NOP) energy for each execution set of the program code is determined. The NOP energy for the execution set is determined based on a position and length of the execution set. The NOP energy also depends on number of cycles required for executing the execution set. At step 104, an incremental instruction energy for each instruction of the execution set is determined. The incremental instruction energy is based on the predicated execution of instructions. At step 106, a base energy of each execution set is computed. The base energy of the execution set is computed by adding the NOP energy and the incremental instruction energy of the execution set. At step 108, an inter-execution set energy of each execution set is computed. The inter-execution set energy of the execution set is based on the number of instruction changes in the execution set. At step 110, the estimated energy usage of each execution set is determined by adding the corresponding base energies and inter-execution set energies. At step 112, the estimated energy usage of the program code is determined by adding the estimated energy usage of all the execution sets of the program code.

Figure 2:
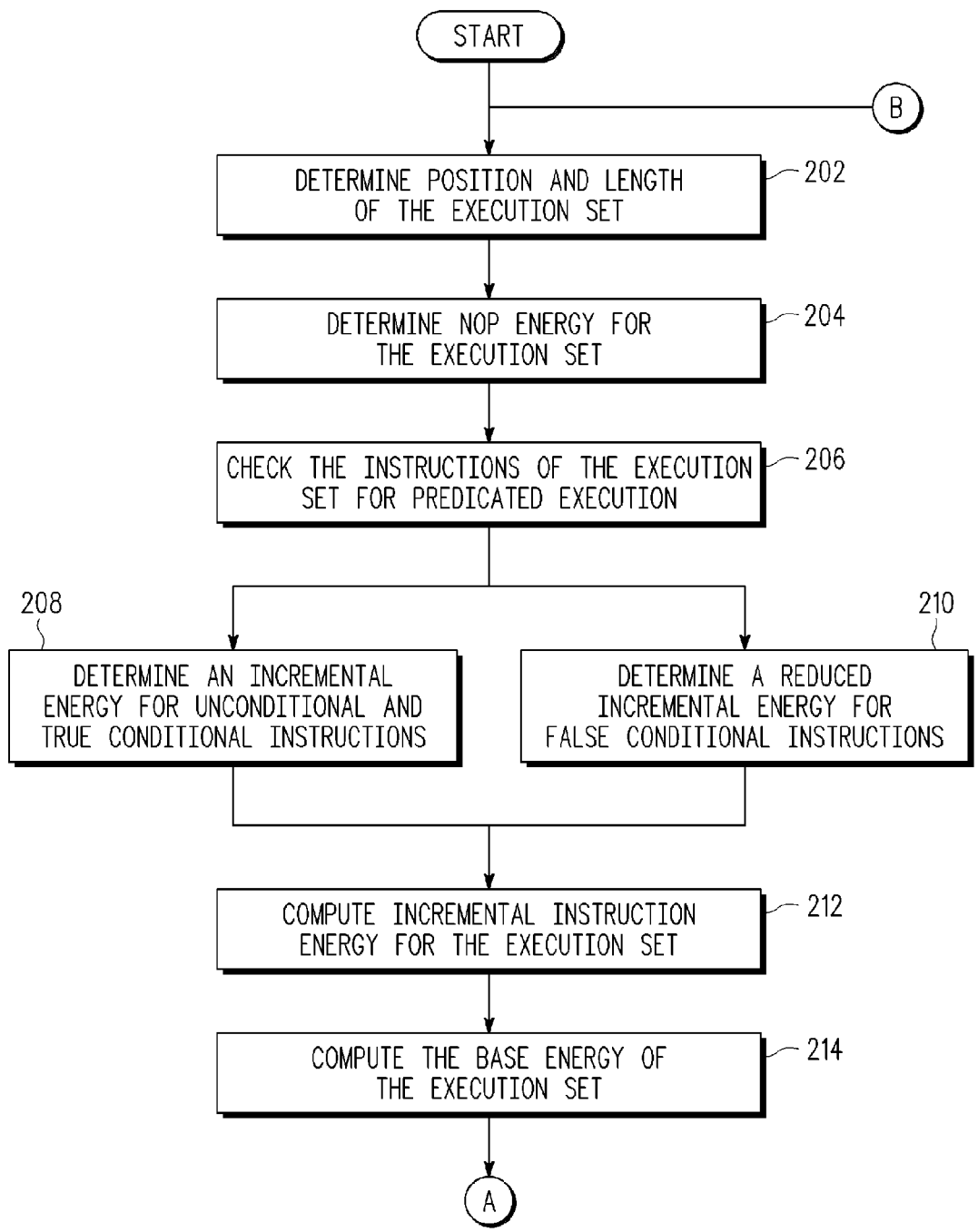
FIGS. 2 and 3 depict a flowchart of a method for estimating energy usage of program code executed by a VLIW-DSP in accordance with an exemplary embodiment of the present invention.
Figure 3:
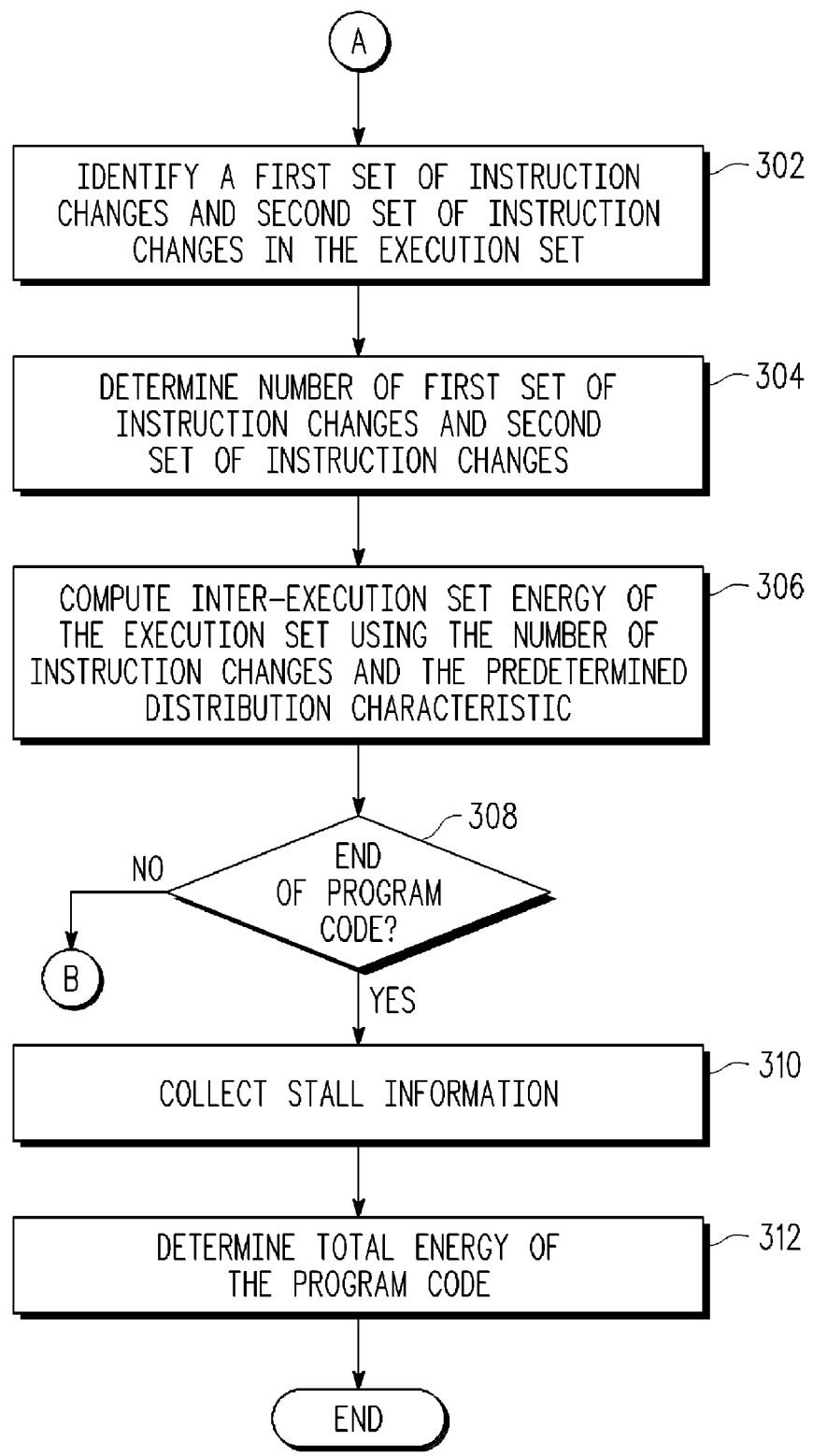

FIGS. 2 and 3 depict a flowchart of a method for estimating the energy usage of the program code that is executable by the VLIW DSP, in accordance with an exemplary embodiment of the present invention. In this embodiment, for the VLIW DSP core 'V', let the program code 'P' include 'm' execution sets. The energy of an $i^{th}$ execution set of the program code P is given by $E^i$. The $i^{th}$ execution set includes $N_i$ instructions, which are executed in parallel by the VLIW DSP core. The instructions of the $i^{th}$ execution set are denoted as $\{I_1, I_2, \ldots, I_{Ni}\}$.

Referring now to FIG. 2, steps 202 and 204 pertain to determining the NOP energy of the $i^{th}$ execution set, henceforth referred to as 'the execution set'. At step 202, a position '$s_i$' and the length '$N_i$' of the execution set is determined. The position $s_i$ of the execution set quantifies the position of the execution set within the program code. For example, the execution set, can be in a straight line code, a hardware loop of the program code, or a special hardware loop without fetches external to the processor core. The length $N_i$ of the execution set refers to the number of instructions of the execution set.

The NOP energy depends on $s_i$ and $N_i$. At step 204, the NOP energy '$E_{NOP}(s_i, N_i)$' of the execution set is determined by using the values of $s_i$ and $N_i$. The NOP energy is a background energy of the execution set, and is equivalent to the energy consumed by an execution set that includes only $N_i$ NOP instructions. The NOP energy includes, for example, energies consumed due to a clock of the VLIW DSP, leakage, instruction fetch and decode executions of the execution set.

Referring again to FIG. 2, the steps 206 to 212 pertain to determining the incremental instruction energy of each instruction of the execution set. At step 206, each instruction from the instructions $\{I_1, I_2, \ldots, I_{Ni}\}$ of the execution set is checked for predicated execution. In other words, it is checked whether an instruction is true conditional, unconditional, or false conditional. For example, a $k^{th}$ instruction of the execution set is checked for predicated execution, where $k \in \{1, 2, \ldots, N_i\}$.

If the instruction is unconditional or true conditional, then at step 208, an incremental energy per cycle of the instruction is determined. For example, for the $k^{th}$ instruction, the incremental energy per cycle is given as $\Delta E_k$. The incremental energy is the average energy for executing the instruction, and is determined by using an incremental energy table. In one embodiment of the present invention, the incremental energy is primarily a function of instruction operand values. Therefore, the incremental energy is computed so as to average out the energy variation due to the data values of the instruction operands. The incremental energy table includes predetermined values of the incremental energy for each instruction of the execution set. For determining incremental energy value for the incremental energy table, the average energy consumed while executing the instruction repeatedly in a hardware loop is computed. The average energy consumed while executing a NOP instruction in the hardware loop is then subtracted from this value to determine the incremental energy value.

However, if the instruction is false conditional, then at step 210, a reduced incremental energy per cycle of the instruction is determined. For example, for the $k^{th}$ instruction, the reduced incremental energy is given as $\Delta E'_k$. The reduced incremental energy is determined by using a reduced incremental energy table. The reduced incremental energy is computed in a manner that is similar to the computation of the incremental energy as described above. The reduced incremental energy table includes predetermined values of the reduced incremental energy for each instruction of the execution set. Therefore, the incremental instruction energy of the $k^{th}$ instruction in the execution set is given as:

$$E_k = n_k[\delta_k \Delta E'_k + (1-\delta_k)\Delta E_k] \quad (1)$$

where $n_k$ is the number of cycles required for executing the $k^{th}$ instruction, and the value of $\delta_k$ is 1 when the $k^{th}$ instruction is false conditional and 0 for an unconditional or true conditional instruction.

Although, the present invention has been described with respect to the predicated execution of instructions, the present invention is also applicable for the VLIW processor cores that do not support predicated execution of the instructions. For such processor cores, the equation (1) is written as:

$$E_k = n_k \Delta E_k \quad (2)$$

At step 212, the incremental instruction energy of the execution set is computed. The incremental instruction energy includes, for example, energies consumed due to decode, dispatch, and execute energies of each of the instructions of the execution set. The incremental instruction energy of the execution set is computed by adding the incremental energies and/or reduced incremental energies of all the instructions of the execution set. Therefore, the incremental instruction energy of the execution set is given as $$\sum_k E_k$$

where k={1, 2, . . . , $N_i$}.

At step 214, the base energy of the execution set is computed. The base energy is computed by adding the total NOP energy of the execution set to the incremental instruction energy. For computing the total NOP energy, the time for executing the instructions are considered. For example, let the number of cycles for executing the instructions $\{I_1, I_2, \ldots, I_{Ni}\}$ be $\{n_{I_1}, n_{I_2}, \ldots, n_{I_{Ni}}\}$. Then, the total execution time of the execution set will correspond to the maximum of the set $\{n_{I_1}, n_{I_2}, \ldots, N_{I_{Ni}}\}$, which is p cycles. The total NOP energy is then given by $pE_{NOP}(s_i, N_i)$. The base energy is then given by the summation of the total NOP energy and the incremental instruction energy of the execution set.

$$E_b^i = pE_{NOP}(s_i, N_i) + \sum_k E_k \quad (3)$$

Referring now to FIG. 3, steps 302 to 306 pertain to computation of the inter-execution set energy. The inter-execution set energy accounts for the change of the execution sets in the VLIW DSP, for example, in the fetch, decode, and dispatch units of the VLIW DSP core. For computing the inter-execution set energy, a first set of instruction changes and a second set of instruction changes are identified, at step 302. The first set of instruction changes includes functional to functional instruction changes. The functional to functional instruction changes refer to the change from execution of the instruction of a functional unit such as ALU, address generate unit, multiplier, etc., to another instruction of a different functional unit. These functional instructions can be in one execution set, or in different execution sets. The second set of instruction changes corresponds to non-functional instructions, and includes functional to NOP instruction changes, functional to prefix instruction changes, NOP to functional instruction changes, and prefix to functional instruction changes. The functional and the non-functional instructions can be in one execution set, or in different execution sets.

On identification of the first and second set of instruction changes, a predefined distribution characteristic of the inter-execution set energy is used to compute the inter-execution set energy. The predefined distribution characteristic can be, for example, linear, quadratic, or cubic in nature.

For obtaining the predefined distribution characteristic, the functional instructions are divided into different functional clusters based on different functional units of the VLIW DSP core. In other words, the functional instructions are differentiated from one another based on the corresponding functional units such as multiply, ALU, load/store, and control. The instructions of the execution set are executed in parallel along several 'lanes' in the VLIW DSP core V. Let the energy consumed when an instruction of, for example, a functional cluster 'c' changes to another instruction of the functional cluster 'd' in any lane of V, be denoted by $k_1(c,d)$. Let $Y_1^i(c,d)$ be the number of changes from one instruction in the functional cluster c to another instruction in the functional cluster d of the execution set in all lanes of V. Further, the energy consumed when an instruction of the functional cluster c changes to a NOP or prefix instruction in any lane of V, be denoted by $k_2$ (c). Let $Y_2^i(c)$ be the number of changes from one instruction in the functional cluster c to the NOP/prefix instruction in all lanes of V.

Then, the inter-execution set energy of the execution set is given by:

$$E_{ies}^i = k_o + \sum_{c,d} k_1(c,d) Y_1^i(c,d) + \sum_c k_2(c) Y_2^i(c) \quad (4)$$

where $k_0$ is a constant energy component. In general, the inter-execution set energy is smaller than the base energy of the execution set. In such a case, for all combinations of the functional clusters c and d, $k_1(c,d)$=constant=$k_1$ Similarly, for all the functional clusters c, $k_2(c)$=constant=$k_2$ Therefore, for all the instruction changes of the first set of instruction changes, the energy can be denoted by $k_1$. Similarly, for all the instruction changes of the second set of instruction changes, the energy can be denoted by $k_2$. Hence, the inter-execution set energy is given by:

$$E_{ies}^i = k_o + k_1 \sum_{c,d} Y_1^i(c,d) + k_2 \sum_c Y_2^i(c) \quad (5)$$

Or $$E_{ies}^i = k_o + k_1 x_1^i + k_2 x_2^i \quad (6)$$

where $k_0$, $k_1$ and $k_2$ constitute a set of inter-execution set energy coefficients and $k_0$ is a constant, $x_1^i$ is the total number of instruction changes of the first set of instruction changes in the execution set in all lanes of V, and $x_2^i$ is the total number of instruction changes of the second set of instruction changes in all lanes of V. This simplification avoids large look-up tables for inter-execution set energy thus saving considerable memory space.

The values of $k_1$ and $k_2$ are obtained from a predetermined distribution of the first and second set of instruction changes. For this purpose, a predetermined pair of execution sets with known values of $x_1^i$ and $x_2^i$ are executed in, for example, a long hardware loop. The average energy consumed during the execution of the pair of execution sets is measured. The inter-execution set energy for the pair of execution sets is then obtained by determining the difference between the measured energy and the base energy of the pair of execution sets for the known values of $x_1$ and $x_2$. Similarly, the inter-execution set energy is determined for different predetermined pairs of execution sets with each predetermined pair having known values of $x_1$ and $x_2$.

In this way, the distribution of the first and second set of instruction changes is obtained. In other words, the variation of the inter-execution set energy with $x_1$, as well as $x_2$ is obtained. The value of $k_1$ is then determined from the variation of the inter-execution set energy with $x_1$. Similarly, the value of $k_2$ is determined from the variation of the inter-execution set energy with $x_2$. The values of $k_1$ and $k_2$ are obtained, for example, by performing a regression analysis on the predetermined distribution of the first and second set of instruction changes. Using the values of $k_1$ and $k_2$ in equation (6) provides the predefined distribution characteristic equation of the inter-execution set energy in terms of $x_1$ and $x_2$.

Referring again to FIG. 3, at step 304, the values of $x_1$ and $x_2$ are determined for the execution set. At step 306, the inter-execution set energy $E_{ies}{}^i$ is determined by using the values of $x_1$ and $x_2$ in the predefined distribution characteristic equation. The total energy for the execution set is now given by:

$$E^i = E_b{}^i + E_{ies}{}^i \qquad (7)$$

At step 308, it is checked whether the program code P has ended. If the program code P has not ended, the base energy and the inter-execution set energy are computed for the next execution set. In this way, the base energy and the inter-execution set energy are computed for each execution set of the program code. The energy of the program code P is then determined by:

$$E_P = \sum_{i=1}^{m} (E_b^i + E_{ies}^i) \qquad (8)$$

However, if the program code P has ended, then step 310 is performed.

The steps 310 and 312 pertain to determining the estimated energy usage of the program code P. At step 310, a stall energy information is collected from the VLIW DSP core V. The stall energy refers to the energy consumed due to stalls of the VLIW DSP core. The stall energy consumption occurs due to, for example, when the VLIW DSP core waits for a response from a memory subsystem of the VLIW DSP. This can occur, during different stall types, for example, cache misses and contention of the memory subsystem. On collecting the stall energy information, the stall energy "$E_{stall}$" is determined. For determining the stall energy, let the VLIW DSP core V have q different types of stalls due to the memory sub-system. Let the energy per cycle of the stall type j be $E_s^j$. Let the number of cycles due to the stall type j while executing the program code P be $c_j$. Then the stall energy is given by:

$$E_{stall} = \sum_{j=1}^{q} C_j E_s^j \qquad (9)$$

At step 312, the total energy of the program code is determined as:

$$E = E_P + E_{stall} \qquad (10)$$

In an embodiment of the present invention, the energy E of the program code is used to estimate the power 'P' of the program code.

$$P = \left(\frac{E}{n_{program}}\right) f \qquad (10)$$

where P is the power of the program code, $n_{program}$ is the number of cycles required for execution of the program code, and f is the clock frequency of the VLIW DSP.

Figure 4:
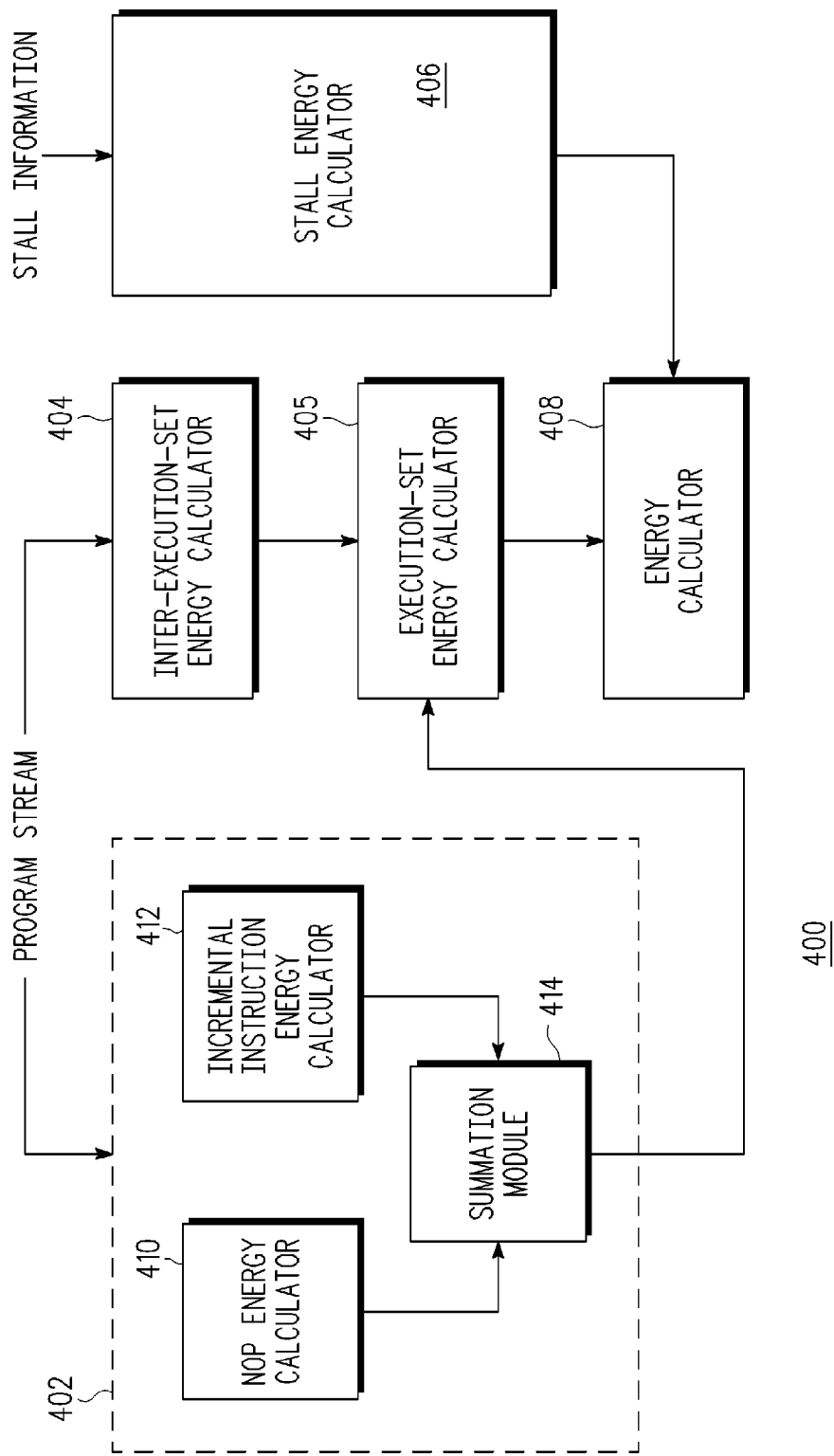
FIG. 4 is a block diagram of an energy usage estimation system for estimating energy usage of program code executed by a VLIW processor in accordance with an embodiment of the present invention.

FIG. 4 is a block diagram of an energy usage estimation system 400 for estimating the energy usage of the program code executable by the VLIW DSP. The energy usage estimation system 400 includes a base energy calculator 402, an inter-execution-set energy calculator 404, an execution set energy calculator 405, a stall energy calculator 406, and an energy calculator 408. The execution set energy calculator 405 is coupled to the base energy calculator 402 and the inter-execution set energy calculator 404. The base energy calculator 402 and the inter-execution set energy calculator 404 receive a program stream as an input. The program stream includes, but is not limited to, the instructions that are being executed and the status of condition flags of the VLIW DSP. In an embodiment of the present invention, the program stream is provided by the ISS of the VLIW DSP core. The base energy calculator 402 computes the base energy of each execution set of the program code. The inter-execution set energy calculator 404 computes the inter-execution set energy of each execution set of the program code. The execution set energy calculator 405 determines the energy usage of each execution set by adding the corresponding base and inter-execution set energies. The energy calculator 408 is coupled to the execution set energy calculator 405 and the stall energy calculator 406. The stall energy calculator 406 receives a stall information as an input. The stall energy calculator 406 determines the stall energy of the program code. The energy calculator 408 determines the energy usage of the program code by adding the energies of all the execution sets of the program code, and the stall energy. In an embodiment of the present invention, the energy calculator 408 estimates the power requirement of the program code from the energy usage of the program code. The energy calculator 408 also outputs the estimated energy usage and power at the end of the execution of the program code.

The base energy calculator 402 includes an NOP energy calculator 410, an incremental instruction energy calculator 412, and a summation module 414. The summation module 414 is coupled to the NOP energy calculator 410, and the incremental instruction energy calculator 412. The NOP energy calculator 410 determines the NOP energy of each execution set of the program code. Further, the incremental instruction energy calculator 412 determines the incremental instruction energy of each instruction of each execution set. The base energy of the execution set is computed by the summation module 414 by summing up the corresponding NOP and total incremental instruction energies.

In another embodiment of the present invention, the energy usage estimation system 400 can be used to statically predict the estimated energy usage of the program code. In this case, the energy usage estimation system 400 takes as input a static value for each branch instruction outcome and status of each conditional flag in the program code. The energy usage estimation system 400 then uses this information to predict the estimated energy usage of the program code as described above.

The system, as described in the present invention or any of its components, may be embodied in the form of a computer system. A typical example of a computer system includes a plurality of workstations networked to a general-purpose computer. The workstations may comprise computers with processors that run either UNIX or Windows, or any other operating system. The computer system may comprise a computer and an input/output device. The computer further comprises a microprocessor. The microprocessor is connected to a communication bus. The computer also includes a memory. The memory may include Random Access Memory (RAM) and Read Only Memory (ROM). The computer system may further comprise a storage device. The storage device can be a hard disk drive or a removable storage drive such as a floppy disk drive, optical disk drive, etc. The storage device can also be other similar means for loading computer programs or other instructions into the computer system.

The computer system executes a set of instructions that are stored in one or more storage elements, to process input data. The storage elements may also hold data or other information as desired. A storage element may be an information source or physical memory element present in the processing machine.

The set of instructions may include various commands that instruct the processing machine to perform specific tasks such as the steps that constitute the method of the present invention. The set of instructions may be in the form of a software program. The software may be in various forms, such as system software or application software. Further, the software may be in the form of a collection of separate programs, a program module with a larger program, or a portion of a program module. The software can be embodied in the form of assembly language or a high level programming language such as C or C++. The processing of input data by the processing machine may be in response to user commands to results of previous processing, or in response to a request made by another processing machine.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. In an electronic device having a very long instruction word (VLIW) processor, a method for estimating energy usage of a program code executed by said processor, the program code including a plurality of instructions organized as groups of execution sets that execute substantially simultaneously, the method comprising:
   determining a no operation (NOP) energy for each execution set based on a position and length of the execution set, and number of cycles for executing the execution set;
   determining an incremental instruction energy of each instruction of each execution set based on predicated execution thereof;
   computing a base energy of each execution set by adding the NOP energy and the incremental instruction energy of the respective execution sets;
   computing an inter-execution set energy of each execution set based on a number of instruction changes in the execution set;
   determining the estimated energy usage of each execution set by adding the base energy and the inter-execution set energy thereof; and
   determining the estimated energy usage of the program code by adding the determined energies of all of the execution sets.

2. The energy usage estimation method of claim 1, further comprising the step of determining a stall energy of the program code, and wherein determining the estimated energy usage of the program code further comprises adding the determined stall energy to the determined energies of all of the execution sets.

3. The energy usage estimation method of claim 2, wherein the stall energy accounts for cache misses and memory contention of the VLIW processor.

4. The energy usage estimation method of claim 1, wherein the position of the program code is selected from one of a short hardware loop and a long hardware loop, wherein the short and long hardware loops include one or more execution sets, and a straight line position.

5. The energy usage estimation method of claim 1, wherein computing the inter-execution set energy comprises identifying a first set of instruction changes and a second set of instruction changes.

6. The energy usage estimation method of claim 5, wherein the first set of instruction changes includes changes from instructions of one functional unit to instructions of a different functional unit.

7. The energy usage estimation method of claim 5, wherein the second set of instruction changes includes functional to NOP instruction changes, functional to prefix instruction changes, NOP to functional instruction changes, and prefix to functional instruction changes.

8. The energy usage estimation method of claim 5, wherein the inter-execution set energy is computed from a predefined distribution characteristic of the inter-execution set energy that is determined from a predetermined distribution of the first and the second sets of instruction changes.

9. The energy usage estimation method of claim 8, wherein the predefined distribution characteristic is used to compute a set of inter-execution set energy coefficients.

10. The energy usage estimation method of claim 9, wherein the set of inter-execution set energy coefficients and the number of instruction changes in each of the first and second sets of instruction changes are used to compute the inter-execution set energy.

11. The energy usage estimation method of claim 1, wherein determining the incremental instruction energy comprises using at least one table including predetermined values.

12. The energy usage estimation method of claim 11, wherein using the at least one table comprises using an incremental energy table for unconditional and true conditional instructions of the plurality of instructions.

13. The energy usage estimation method of claim 12, wherein the incremental energy table includes an incremental energy value for each instruction type.

14. The energy usage estimation method of claim 11, wherein using the at least one table comprises using a reduced incremental energy table for false conditional instructions of the plurality of instructions.

15. The energy usage estimation method of claim 14, wherein the reduced incremental energy table includes a reduced incremental energy value for each instruction of the plurality of instructions.

16. The energy usage estimation method of claim 1, further comprising the steps of:
   comparing the estimated energy usage with a predetermined energy usage level; and
   rewriting the program code if the estimated energy usage is greater than the predetermined energy usage level.

17. The energy usage estimation method of claim 1, further comprising the steps of:
   subtracting the estimated energy usage from a current battery energy level; and
   predicting an amount of time until the battery energy level falls below a predetermined value.

18. In a battery operated electronic device having a very long instruction word (VLIW) processor, a system for estimating energy usage of a program code executed by said processor, the program code including a plurality of instructions organized as groups of execution sets that execute substantially simultaneously, the system comprising:
   a base energy calculator for computing a base energy of each execution set by adding a no operation (NOP) energy and an incremental instruction energy of the respective execution sets;

an inter-execution set energy calculator for computing an inter-execution set energy of each execution set based on a number of instruction changes in the execution set;

an execution set energy calculator coupled to the base energy calculator and the inter-execution set energy calculator, for determining the estimated energy usage of each execution set by adding the base energy and the inter-execution set energy thereof;

a stall energy calculator for computing a stall energy of the program code; and an energy calculator coupled to the execution set energy calculator and the stall energy calculator, for determining the estimated energy usage of the program code by adding the determined energies of all of the execution sets and the stall energy.

19. The energy usage estimation system of claim 18, wherein the base energy calculator comprises:

an NOP energy calculator for determining the NOP energy;

an incremental instruction energy calculator for determining an incremental instruction energy of each instruction of each execution set based on predicated execution thereof; and a summation module coupled to the NOP energy calculator and the incremental instruction calculator, for summing the NOP energy and the incremental instruction energy to compute the base energy.

20. A non-transitory computer readable storage medium for storing a computer program for estimating energy usage of a program code executed by a very long instruction word (VLIW) processor, the program code including a plurality of instructions organized as groups of execution sets that execute substantially simultaneously, the computer program comprising:

program instructions for determining a no operation (NOP) energy for each execution set based on a position and length of the execution set, and number of cycles for executing the execution set;

program instructions for determining an incremental instruction energy of each instruction of each execution set based on predicated execution thereof;

program instructions for computing a base energy of each execution set by adding the NOP energy and the incremental instruction energy of the respective execution sets;

program instructions for computing an inter-execution set energy of each execution set based on a number of instruction changes in the execution set;

program instructions for determining the estimated energy usage of each execution set by adding the base energy and the inter-execution set energy thereof; and program instructions for determining the estimated energy usage of the program code by adding the determined energies of all of the execution sets.

* * * * *